United States Patent [19]

Tajkowski

[11] 3,899,366

[45] Aug. 12, 1975

[54] TREATED SUBSTRATE FOR THE FORMATION OF DROP-WISE CONDENSATES AND THE PROCESS FOR PREPARING SAME

[75] Inventor: Edward George Tajkowski, Williamsville, N.Y.

[73] Assignee: Allied Chemical Corporation, New York, N.Y.

[22] Filed: Nov. 5, 1973

[21] Appl. No.: 412,991

[52] U.S. Cl. ...... 148/6.16; 148/6.14 R; 148/6.15 R; 148/6.2; 148/6.27; 117/121; 117/127; 117/135.5
[51] Int. Cl. .............................................. C23f 7/26
[58] Field of Search .......... 148/6.2, 6.14 R, 6.15 R, 148/6.27, 6.16; 117/49, 127

[56] References Cited
UNITED STATES PATENTS
2,662,835   12/1953   Reid ............................... 117/127 X
3,284,248   11/1966   Rumberger ..................... 117/127 X
3,498,958   3/1970    Ray-Chaudhuri ............... 117/127 X
3,795,549   3/1974    Matsushima et al. ............ 148/6.2 X

*Primary Examiner*—Ralph S. Kendall
*Assistant Examiner*—Harris A. Pitlick
*Attorney, Agent, or Firm*—Michael L. Dunn; Jay P. Friedenson

[57]        ABSTRACT

A novel treated metal surface for promoting drop-wise condensation and the process for treating same. The process comprises applying a first solution comprising chromate ions to a metal substrate followed by applying a small water-repellent effective amount of a saturated fluorinated compound selected from carboxylic acids and phosphate esters.

41 Claims, No Drawings

TREATED SUBSTRATE FOR THE FORMATION OF DROP-WISE CONDENSATES AND THE PROCESS FOR PREPARING SAME

BACKGROUND OF THE INVENTION

This invention relates to a process for coating a metal to increase corrosion resistance and cause the formation of a drop-wise aqueous condensate when the relatively cool metal is exposed to a relatively warm vapor such as steam and further relates to the novel coated metal.

It is known in the prior art that drop-wise rather than film-type condensation of vapor, on metal surfaces such as cooling coils, improves heat transfer from the coil to the vapor or gas being cooled. The formation of film condensate on a condensing surface creates an insulating barrier which reduces heat transfer, thus lowering condensing efficiency; whereas, the formation of drops rather than film permits greater exposure of the condensing surface to the vapor or gas.

Various substances have been used to promote drop-wise condensation on metallic surfaces. Examples of such drop-wise condensation promoters are organo silicon halides, such as dimethyl silicon dichloride; silicone resins; fluorine-substituted compounds, such as tetrafluoroethylene polymer and perfluorolauric acid; fatty acids, such as oleic acid and lauric acid; fatty acid salts, such as calcium stearate and copper and chromium oleates; oils, such as light machine oil and animal and vegetable oils; waxes, such as bee's wax; hydrocarbons containing sulfur and/or oxygen, such as mercaptans, decamethylene di (potassium xanthate), didodecyl trithiocarbonate, octadecanethiol (stearyl mercaptan), octadecyl N-acetyldithiocarbamate, 1:10-bis-dodecylthiodecane, dioctadecyl hydrogen phosphorothiolothionate, di(bis-dodecylthiophosphionthioyl) sulphide, and tetrakis (decylthio) silane; selenium compounds, such as dodecyl-1 lselocyanatoundecanethiolate, octadecyl selenocyanate. Silver-plated steel and other oxide-free metal surfaces such as noble metal surfaces of rhodium, palladium, platinum and gold have also been used.

All of the foregoing substances which promote drop-wise condensation have one or more disadvantages. One of the most serious disadvantages characteristic of many of the above substances used in the prior art to promote drop-wise condensation is poor durability. Coatings known in the prior art frequently last less than three weeks in continuous usage. A number of the foregoing promoters of drop-wise condensation, although forming drops on the condensing surface, are not as good as other promoters for drop-wise condensation in that the drops are flatter and have a stronger tendency to wet the surface. A large number of the prior art promoters for drop-wise condensation are sensitive to temperature and frequently fail at temperatures above 300°F. Other promoters for drop-wise condensation cause reduced efficiency due to the insulating effect of the drop-wise promoters on the condensing coil. An example of such an insulating promoter is polytetrafluoroethylene. The majority of the prior art promoters for drop-wise condensation become fouled and permit corrosion of the condensing coils when minerals or entrained air are present in the steam or other vapor being condensed. An obvious disadvantage of noble metal promoters is economics.

In accordance with the present invention a novel class of promoters for drop-wise condensation which overcome the above noted disadvantages is provided. In addition a process for applying drop-wise promoters to condensing coils is disclosed which permits the formation of a condensing coil, which promotes drop-wise condensation for lengthy time periods, e.g., in excess of 1 year, in continuous usage and improves corrosion resistance of the coil. The condensing coil in accordance with this invention collects a drop-wise condensate, has a high condensing efficiency, and will operate for prolonged periods upon commercial unpurified steam.

BRIEF DESCRIPTION OF THE INVENTION

The prior art disadvantages mentioned above are overcome by the present invention wherein the surface of a metal substrate is cleaned and given a chromate conversion coating by applying a first solution comprising chromate ions to the substrate to form a chromate ion treated surface. A small, water-repellent effective amount of a fluorochemical is then applied to the chromate ion treated surface. The fluorochemical is a saturated fluorinated compound selected from carboxylic acids and phosphate esters and contains at least 6 carbon atoms in a terminal perfluorinated chain which is capable of reacting with a metal cation of the conversion coating to form a salt or complex which is substantially insoluble as a solid in water or steam. "Chromate conversion coating" may be defined as any protective coating formed by treating a metal surface with a solution containing chromate ions to create a surface at least partially formed from the metal being protected. The conversion coated surface is generally amorphous rather than crystalline in nature. As used in the above definition "protective coating" means any film which is more inert to chemical oxidation than the original uncoated surface.

This invention is concerned with the treatment of surfaces of certain metal substrates which have been conversion coated with a chromium composition and with the resulting treated surfaces. The process of the invention is particularly effective with copper and aluminum and alloys of copper or aluminum. When the chromium conversion coated surface is treated with the fluorinated compound a complex is formed at the surface which is substantially insoluble in water or steam, is highly corrosion resistant and promotes drop-wise condensation.

The novel process comprises dipping the freshly chromium conversion-coated metal (for methods known in the art for applying the chromium conversion coating, i.e., nonelectrolytic, chromium conversion coatings, see R. M. Burns and W. W. Bradley *Protective Coatings for Metals*, 3rd Ed. 1967, pp. 568–621) into a fluorochemical hydrophobic organic treatment agent which may be in liquid form or in the form of an aqueous-alcoholic, or other compatible solution. When applied from solution, the concentration of treatment agent ranges from 0.02 to 10 percent by weight but is preferably from about 0.05 percent to about 1 percent by weight. Low concentrations tend to take extended periods to deposit the treatment agent upon the surface whereas high concentrations deposit too much treatment agent which must subsequently be removed. The fluorochemical has a perfluorinated alkyl or alkoxy chain containing at least 6 carbon atoms and has at least one reactive group selected from carboxylic acid and phosphate ester. The effective amount of the treatment agent has been found to be between about $3.7 \times 10^{-6}$ and about $2.5 \times 10^{-5}$ millimoles per square centimeter and perferably between about $7.5 \times 10^{-6}$ and about $1.5 \times 10^{-6}$ millimoles per square centimeter. Any excess is removed by any convenient means such as by rinsing the treated conversion-coated metal with a solvent such as alcohol. The resulting conversion-coated metal with the treatment agent acts as a corrosion resistant drop-wise condenser when the treated metal is used as a condensing surface for water or aqueous alcoholic vapor. The drop-wise condensation result not only increases the efficiency of heat transfer but inhibits the formation of a sheet-ice deposit when the treated metal is employed as a condensing surface under freezing temperature conditions. The chromium-conversion coating solution will generally contain from about 0.1 to about 0.5 percent chromic acid or other hexavalent chromium compound in conjunction with sulfuric acid, nitric acid, hydrochloric acid or other compatible mineral acid to lower the pH to a range of from about 1.5 to 2.5, although the solution is preferably essentially free from phosphate ions since such ions tend to decrease durability of the coating. Other additives may be added to the chromium conversion coating solution such as from about 0.04 to about 5 weight percent and more preferably from about 0.07 to about 1 weight percent of fluoride ion to control etching; organic or inorganic corrosion inhibitors; buffers or other organic or inorganic components which act to maintain the concentration of etchants; or deoxidizers to maintain or obtain a clean surface and others as will readily occur to those skilled in the art.

The product of the invention comprises the metal substrate which has been treated in accordance with the process of the invention.

DETAILED DESCRIPTION OF THE INVENTION

According to the process of the invention a metal selected from aluminum, copper and alloys of aluminum or copper is coated with an amorphous chromium-containing chemical conversion coating and thereafter is coated with a small, waterrepellent effective amount of a fluorinated hydrophobic compound. The fluorinated hydrophobic compound is a saturated organic fluorinated compound having a terminal perfluorinated chain of at least six carbon atoms which compound is capable of reacting with metal cations in the conversion coating, which may be metal cations in the conversion coating orginating in the substrate, to form salts or complex compounds of the metal cations which are substantially insoluble or non-dispersible in water and in a 15 percent volume aqueous alcohol solution at about 95° to 100°C.

Preferably, the metal is coated with an amorphous, chromium-containing chemical conversion coating from a solution comprising from about 0.1 to about 0.5 percent chromic acid or other hexavalent chromium compound and sufficient sulfuric, nitric or hydrochloric acid to reduce the pH of the chromium solution to from about 1.5 to about 2.5. The conversioncoated metal is then coated with the fluorinated hydrophobic organic treatment agent.

The preferred fluorinated compounds used in the process of the invention are fluorinated alkyl compounds having at least one polar group selected from phosphate ester and carboxylic acid. Also effective, and most preferred are fluorinated alkoxy alkyl phosphate esters or carboxylic acids.

Fluorinated compounds found particularly desirable are those selected from the following:

1. fluorinated alkoxyalkyl monocarboxylic acids containing 7 to 22 carbon atoms and preferably from 9 to 15 carbon atoms,
2. fluorinated alkoxyalkyl dicarboxylic acids containing from 18 to 44 carbon atoms,
3. fluorinated alkoxyalkyl phosphoric acid esters containing from 8 to 44 carbon atoms.

Preferred fluorinated alkoxyalkyl carboxylic acids useful in the invention may be represented by the general formula:

wherein

1. $R_f$ is a perfluoroalkyl radical containing 3 to 12 carbon atoms and is preferably a perfluoroisoalkyl radical of the formula

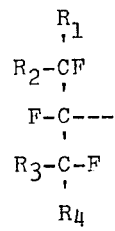

wherein $R_1$, $R_2$, $R_3$ and $R_4$ independently at each occurrence can be fluorine or perfluoro-lower-alkyl groups containing 1 to 4 carbon atoms, or one of $R_1$ and $R_2$ and one of $R_3$ and $R_4$ taken together can form a cyclic perfluoroalkylene of 4 to 6 carbon atoms.

2. X is H or F and may be the same or different at each occurrence,
3. $m$ is an integer 2 to 10, and
4. $n$ is an integer 0 to 10.

These fluorinated alkoxyalkyl carboxylic acids may be prepared from the compound
(I) $R_fO(CF_2)_m(CH_2)_nCH_2I$ as follows:
(I) $\xrightarrow{KCN}$ (II) $R_fO(CF_2)_m(CH_2)_nCH_2C \equiv N$
(II) $\xrightarrow{Acid}$ (III) $R_fO(CF_2)_m(CH_2)_nCH_2COOH$ Preferred fluorinated alkoxyalkyl dicarboxylic acids which may be used in the invention may be represented by the formula:

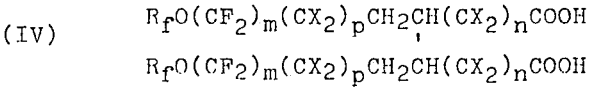

wherein $R_f$, X, $m$ and $n$ are as previously defined, $m$ and $n$ may be the same or different at each occurrence and $p$ independently at each occurrence is an integer of 0 to 10.

The presence of two carboxyl- or carboxy-derived substituents in the molecules provide reactive sites for bonding, such as by chemisorption or adsorption of the compound to a substrate.

The dicarboxylic acids represented by Formula (IV) below are conveniently prepared by reaction (illustrated in Equation 1 below) of an iodo-monocarboxylic acid (V) with zinc or other metal capable of forming a stable metal iodide salt.

Equation 1 ($R_f$, $m$, $n$ and $X$ have the meanings given above).

(V) 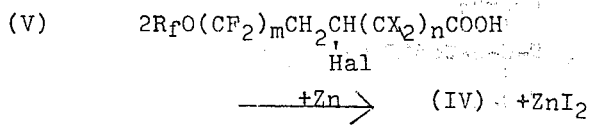

where Hal is bromine or iodine.

The reaction is carried out by heating a mixture of the iodo acid (V) and the metal conveniently charged in pulverulent form, desirably with vigorous agitation at about 60°–100°C., especially at 80°–90°C. At the latter reaction temperature, the reaction proceeds to completion in about two to four hours. The deiodination reaction of Equation 1 is generally accompanied by a side reaction (Equation 2) involving reductive deiodination of the starting material and by a side reaction (Equation 3) involving dehydroiodination of the starting material.

Equation 2 ($R_f$, $m$, $n$ and $X$ have the meanings given above).

(V)  (VI)

Equation 3 ($R_f$, $m$, $n$ and $X$ have the meanings given above).

(V) 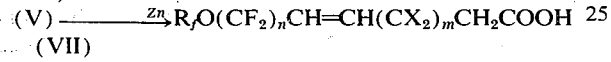
(VII)

The formation of the aforementioned side products (VI) and (VII) is advantageously diminished by carrying out the reaction in the presence of an aprotic organic solvent, especially an aprotic solvent having unshared electron-containing substituents, that is, an electron-donor solvent. Typical aprotic electrodonor solvents for this advantageous mode of operation include 1,4-dioxane, 1,2-dimethyoxyethane and acetic anhydride. The reaction can also be carried out in protonic solvents, such as glacial acetic acid or ethanol, with the penalty of a lower yield of the desired dicarboxylic acid product. Advantageously, about 3 to 4 molar proportions of solvent per molar proportion of iodoacid are employed. Desirably also, air and moisture are substantially excluded from the reaction mixture.

While the reaction can be effected by charging as little as a stoichiometric proportion of zinc, the zinc is desirably charged in excess, that is, about one to two gram atoms of zinc per molar proportion of the iodoacid are employed. While zinc charged conveniently as a copper couple or alloy containing about 5 to 10 weight percent copper is the preferred deiodination reagent of the reaction, the reaction can also be performed using zinc amalgam, sodium amalgam, mercury, copper, silver, pure zinc or magnesium as the deiodination agent.

Separation of the desired dicarboxylic acid from the crude reaction product can be carried out by conventional techniques such as distillation.

Other preferred fluorinated alkoxyalkyl dicarboxylic acids suitable for use in accordance with this invention may be represented by the formula (VIII) 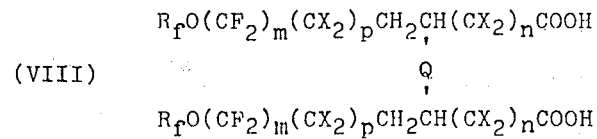

wherein $R_f$, $X$, $m$, $n$ and $p$ are as previously defined and Q is a divalent radical of the formula:

wherein $z$ is 2 to 6 and $t$ is 0 or 1.

These compounds may be prepared by reacting (V) with $A_2S(C_zH_{2z}S)_t$ wherein A is an alkali metal cation.

Intermediate (V) may be prepared by telomerizing $R_f(CF_2)_n(CX_2)_pI$ with an acid of the formula $CH_2=CH(CX_2)_nCOOH$.

The fluorinated alkoxyalkyl phosphoric acid esters including fluorinated isoalkoxyalkyl phosphoric acid esters, may be prepared by any of several conventional ways. In one method, an alcohol, having the formula (IX) 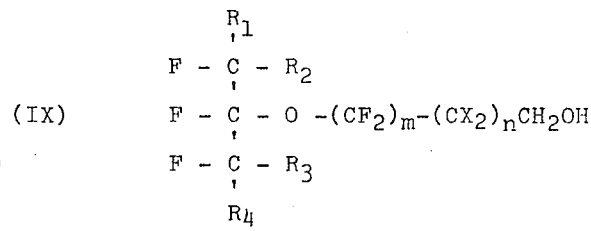

wherein $R_1$, $R_2$, $R_3$, $R_4$, $X$, $m$ and $n$ are as previously defined above, reacted with phosphorous oxychloride in the presence of a tertiary amine acid acceptor such as pyridine or trimethylamine in the optional presence of an organic liquid as diluent such as ether, benzene or toluene. The reagents are initially brought into contact at 0° to 25°C. and the reaction mixture is then heated at a reflux temperature of about 50° to about 150°C. By varying the ratios of the reactants, the relative amount of mono-ester, di-ester and tri-ester produced can be affected. The phosphorochloridate product can then be hydrolyzed to the ester. The optimum conditions for the above reactions involving the phosphorochloridate product will vary with the particular reaction and may easily be determined by one skilled in the art.

In another method, the polyfluoroalkyl alcohol described may be reacted with phosphorous pentoxide to yield the esters. For this reaction preferably about 3 moles of the alcohol are mixed with one mole of the pentoxide and the mixture is heated between 30° and 200°C. without the use of a solvent or base.

An alcohol starting material may be prepared from the corresponding telomers of the formula

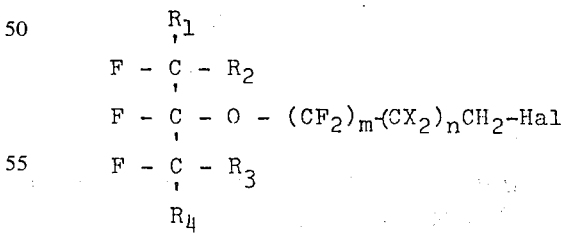

by reaction with $SO_3$ to produce the corresponding acid halide, reacting the acid halide with an alkanol at temperatures in the range of about 0°–24°C. to form the corresponding ester, followed by reduction of the ester with a mild reducing agent such as $LiAlH_4$ in ether to form the desired alcohol.

Another generalized route to these alcohols is to react the corresponding telomer as described above with $SO_3$ to form the corresponding polysulfates, followed by hydrolysis of the polysulfate with 35 –50 percent $H_2SO_4$ at about 100°C. to the desired alcohol.

The alkoxy phosphoric acids having a straight chain alkyl group rather than the isoalkyl group may be similarly prepared or prepared in accordance with U.S. Pat. No. 3,083,224.

The polyfluoroisoalkoxyalkyl iodides used in the above methods are known and the preparation thereof, are disclosed in Belgium Patent No. 714,162. Essentially, these iodides, referred to as telomers in the above Belgium patent, may be prepared by telomerizing telogens of the formula

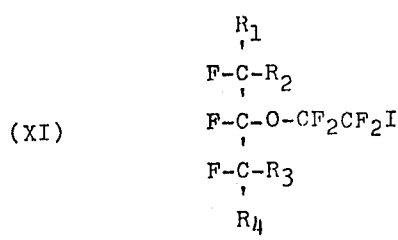

(XI)

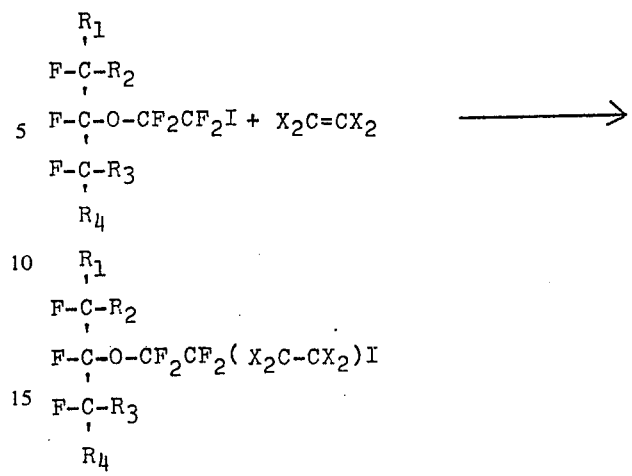

wherein $R_1$, $R_2$, $R_3$ and $R_4$ are as indicated above. The reaction of the telogens of Formula (XI) with a suitable telomerizable unsaturated material will give repeating units of the radical $-(X_2C-CX_2)-$ in the molecule The longer chain iodide starting telomer materials having an odd number of carbon atoms in the carbon chain are telomers which may be prepared by the following procedure:

The polyfluoroisoalkoxyalkyl iodide telogen of the Formula (XI) is reacted with sulfur trioxide to form an acid halide. The acid halide is hydrolyzed to the acid by refluxing in water. The resulting acid has a single carbon atom linking the oxygen atom with the carboxy group. This acid can then be converted to the corresponding telogen iodide possessing a single carbon atom linking the oxygen and iodide atoms by the well known Hunsdiecker reaction. This telogen iodide can then be telomerized with one or more olefins. Illustrative procedures are shown as follows:

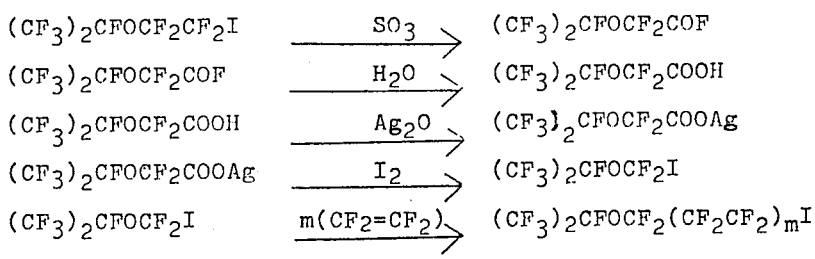

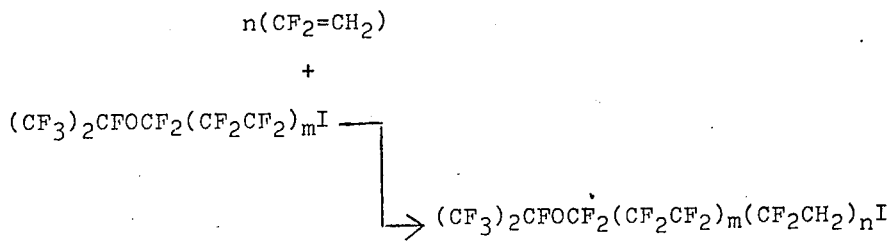

thus forming a molecule having an even number of carbon atoms in the carbon chain. For example The initial compound of formula (XI) is prepared by the following reaction

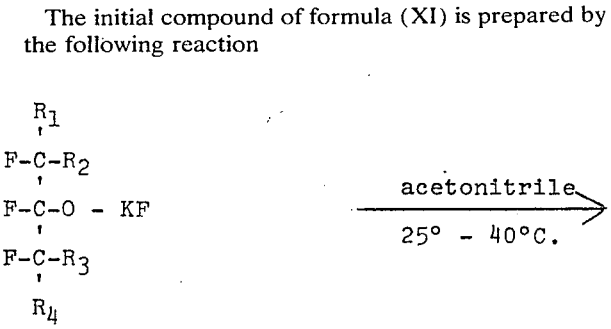

—Continued

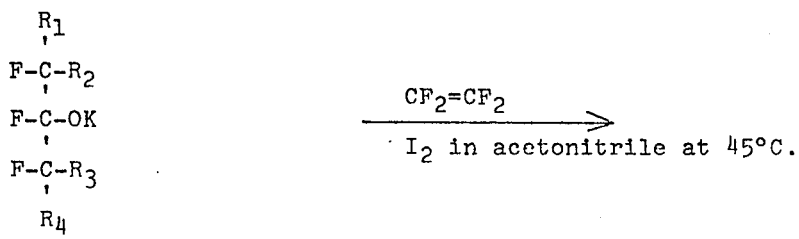

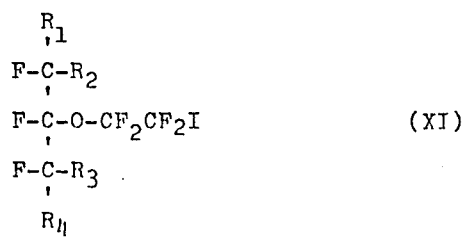

Generally, the fluorinated compounds which have been found to promote drop-wise condensation in accordance with this invention are polyfluoroalkoxyalkyl compounds such as:

(1) $(CF_3)_2CFO(CF_2)_m(CH_2)_nCO_2H$, wherein $m$ equals 2 to 10 and $n$ equals 0 to 10, and the sum of $m$ and $n$ is at least 6.

(2) $[(CF_3)_2CFO(CF_2)_mCH_2CH(CH_2)_nCO_2H]_2$, wherein $m$ equals 2 to 10 and $n$ equals 0 to 10.

(3) $[R_f(CF_2)_m(CX_2)_nCH_2CH_2O]_yPO(OH)_{3-y}$
wherein $m$ equals 2 to 10, $n$ equals 0 to 10, $y$ equals 1 to 2, X is independently at each occurrence H or F, $R_f$ is a perfluroalkyl radical containing 3 to 12 carbon atoms, and the sum of m and $n$ is at least 5.

(4) $(CF_3)_2CFO(CF_2)_mCH(CH_2)_nCO_2H$;

wherein $m$ and $n$ are 1 to 10; connected to another similar substituent by a cross-link Q via the carbon atom having the open valence, wherein Q is $—S(C_zH_{2z}S)_t—$, $z$ is 2 to 6, $t$ is 0 to 1, and $m$ or $n$ may be the same or different in the different substituents.

(5) $(CF_3)_2CFORCON-R''-CO_2H$
         |
         R' wherein R is alkylene or haloalkylene, R' is hydrogen or alkyl and R'' is alkylene. Likewise effective are phosphate esters such as $[R_fSO_2N(R)(R')O]_yPO(OH)_{3-y}$ wherein R is hydrogen or an alkyl group having 1 to 12 carbon atoms, R' is an alkylene linking group containing 2 to 12 carbon atoms, $R_f$ is a perfluoroalkyl group containing 6 – 12 carbon atoms which may be either linear or branched, $C_nF_{2n+1}$ or perfluorocycloalkyl $C_nF_{2n-1}$ wherein $n$ is 1 to 18 and $y$ is 1 to 2.

The most preferred phosphoric acid composition for use in accordance with this invention is a mixture comprising between about 80 and about 90 mole percent $[C_3F_7O(CF_2)_6C_2H_4O]_2PO(OH)$ and between about 10 and about 20 mole percent $C_3F_7O(CF_2)_6C_2H_4OPO(OH)_2$.

These compounds when applied to a chromium conversion coated metal as previously discussed, form corrosion resistant water-repellent surfaces which cause liquid to form droplets having advancing and receding contact angles with the surface of at least 90° at a temperature of from 75° to 100°C. The contact angle is an angle formed by the coated surface with a tangent to the surface of the drop at the intersection of the surface of the drop with the coated surface. The contact angle is that angle between the tangent and coated surface wherein the drop is situated.

The contact angle of the drop with the coated surface is a measure of the liquid repellency of the surface. A contact angle of 90° or more is considered to be an indication of superior liquid repellency by the coated substrate and is a further indication of excellent condensation upon the coated surface.

The advancing contact angle, $\theta_A$, is the contact angle observed in advancing the liquid boundary over a dry, clean surface, and the receding contact angle $\theta_R$ is the contact angle observed in receding the liquid boundary over the previously wetted surface.

In general, the larger the contact angle, and the smaller the difference between advancing and receding contact angles the greater the liquid repellency of the surface and the greater the tendency to form a drop-wise condensate.

For a comprehensive discussion of the significance of the contact angle, see *Contact Angle, Wettability and Adhesion*, Advances in Chemistry Series: Vol. 43, p. 5, American Chemical Society, 1964.

The metal substrate treated in accordance with the process of the invention is unique in that the surface will promote drop-wise condensation at elevated temperatures, e.g. 150°C. for extended periods of time. While the precise structure of the treated surface is not known it is believed that the chromate ions react with the metallic surface to form an amorphous surface comprising both chromium and the metal being coated. It is further believed that when the fluorochemical is applied to the chromium treated surface the carboxylic acid or phosphate ester groups react with the amorphous structure to firmly anchor the fluorochemical to the surface thus substantially increasing durability.

DESCRIPTION OF THE PREFERRED EMBODIMENTS

The following examples serve to illustrate the process of the invention and to show the novel characteristics of the resulting treated metal substrate. Proportions and percentages are by weight, unless otherwise noted, and temperatures are in degrees Centigrade.

EXAMPLE 1

A 2-inch by 3-inch coupon of aluminum alloy, NO. 1100 (commercially pure aluminum) is coated with an amorphous, chromate conversion coating applied from an aqueous, acidic solution containing 3.5 gm of chromic acid ($CrO_3$), and 1.5 gm of sodium fluoride per liter of water. The metal is first cleaned and deoxidized by conventional chemical means, rinsed with water, dried and immersed in the conversion coating solution for about 3 to 5 minutes at temperatures of 25°–45°C. and a pH of 1.6–2.0.

The resultant chromate-conversion coated sample is removed from the chromating solution, rinsed with water at room temperature and allowed to dry at ambient temperature. The conversion-coated sample is then immersed for 2 minutes in a bath maintained at room temperature which is prepared by diluting 25 ml. of a 1 percent ethylene glycol monoethyl ether solution of the perfluorinated dicarboxylic acid of the formula

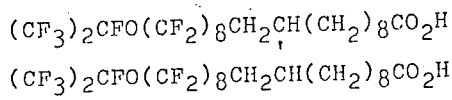

$$(CF_3)_2CFO(CF_2)_8CH_2CH(CH_2)_8CO_2H$$
$$(CF_3)_2CFO(CF_2)_8CH_2CH(CH_2)_8CO_2H$$

with 225 ml. of 50 percent by volume aqueous isopropyl alcohol to provide about a 0.1 percent concentration of the fluorinated dicarboxylic acid in the bath. The treated sample is withdrawn from the bath, rinsed with water at room temperature, dried in a stream of air and then heated in an oven maintained at 60° for ten minutes to simulate the normal aging of the conversion coating. The resultant sample coupon containing a coating of the fluorinated dicarboxylic acid is tested for water repellency by applying a droplet of water on the surface and determining the advancing contact angle, $\theta_A$, employing a goniometer, and by visually estimating the receding angle, $\theta_R$. The progressing or advancing contact angle with water is 145° corresponding to a high negative wetting energy from a dry surface, ($\tau_e$). The $\tau_e$ is computed to be 59.0 dynes per cm. from the equation $\tau_e = \gamma \cos \theta_A$ where $\gamma$ is the surface tension of water at room temperature, which is 72.0 dynes per cm. The visually estimated retreating contact angle, $\theta_R$, of the treated sample is between about 90° and 120° corresponding to a dewetting energy from a wet surface ($\tau_s$), of from 0 to about −36.0 dynes per cm. according to the equation $\tau_s = \gamma \cos \theta_R$ wherein $\gamma$ has the previously described meaning. Thus, the net dewetting energy ($\Delta\tau$) of the treated sample is between about 59.0 and about 23.0 dynes per cm. as computed from the equation $\Delta\tau = \tau_s - \tau_e$.

This high dewetting energy of the treated sample is indicative of the exceptionally good water-repellency of the fluorocarbon treated sample.

EXAMPLE 2

The procedure of Example 1 is repeated substantially as described except that treatment of the conversion coated aluminum sample with the aqueous alcoholic solution of the fluorinated polycaboxylic acid is omitted. After air-drying and heating of the sample at 65° for about 10 minutes, the advancing contact angle $\theta_A$ of the sample surface with water in air is no greater than 16° as measured with a goniometer at room temperature. The receding or retreating contact angle $\theta_R$ of the treated sample with water is visually estimated as being about 0°. The corresponding net dewetting energy of the sample, $\Delta\tau$, is no more than about 2.8 dynes per cm. This low value for $\Delta\tau$ indicates the high degree of wettability and poor water-repellency of the sample. It should be pointed out, however, that a low dewetting energy is not always indicative of low liquid repellency since where $\theta_R$ and $\theta_A$ both approach 90° or greater than net dewetting energy may approach zero since the surface is not wetted originally.

EXAMPLE 3

The procedure of Example 1 is repeated substantially as described except that the treatment solution is 300 ml. of a 0.1 percent solution of a perfluorinated isoalkoxy-alkoxy phosphoric acid of the formula $(CF_3)_2CFO(CF_2)_8(CH_2)_{11}OPO(OH)_2$ in about 50 percent by volume aqueous isopropyl alcohol and the water rinsing of the treated sample is omitted. After the treated sample has been heated at 65° for about 10 minutes to simulate aging of the conversion coating, the advancing contact angle of the sample with water is determined with a goniometer to be 160°. The receding contact angle of the sample with water is visually estimated to be of the order of about 120°. These contact angles are indicative of an excellent degree of water-repellency, inasmuch as they correspond to a net dewetting energy, $\Delta\tau$, of about 31.7 dynes per cm. and indicate minimal initial wetting because the angles are substantially greater than 90°.

EXAMPLES 4 – 37

In the following examples summarized in Table I below, the procedure of Example 1 in repeated substantially as described except that different metal substrates, different conversion coatings, different treatment conditions, and/or different bath solutions are employed as indicated in Table I. In each of the summarized examples, a product having an excellent degree of water repellency substantially similar to that obtained in Examples 1 and 3 above is obtained.

TABLE I

| Example | Metal Substrate | Conversion Coating Applied to Metal Substrate | Treatment Agent | Treatment Agent Bath Solvent | Temp. of Bath | Conc. of Treatment Agent in Bath | Other Variations in Procedure of Example 1 |
|---|---|---|---|---|---|---|---|
| 4 | AL.#1100 | as in Ex. 1 | as in Ex. 1 | Eq. Vols. Ethylene Glycol Monoethyl Ether | Rm. Temp. | 1.0% | None |
| 5 | -do- | -do- | $(CF_3)_2CFO(CF_2)_8(CH_2)_{10}CO_2H$ | 50% by vlm. isopropanol in water | 65° | 0.1% | Final water rinsing omitted |

TABLE I (cont)

| Example | Metal Substrate | Conversion Coating Applied to Metal Substrate | Treatment Agent | Treatment Agent Bath Solvent | Temp. of Bath | Conc. of Treatment Agent in Bath | Other Variations in Procedure of Example 1 |
|---|---|---|---|---|---|---|---|
| 6 | -do- | -do- | $(CF_3)_2CFO(CF_2)_3(CH_2)_2OPO(OH)_2$ | as in Ex. 5 | -do- | -do- | -do- |
| 7 | -do- | -do- | $(CF_3)_2CFO(CF_2)_5CO_2H$ | -do- | -do- | -do- | -do- |
| 8 | Aluminum 3003 Alloy | -do- | as in Example 6 | 1:1:2 by volume mixture of tetrahydrofurfuryl alcohol, isopropanol and water | 70-75° | 0.1% | a 3" x 4" coupon of aluminum alloy is employed, heating step is replaced by aging for 3 days at room temperature |
| 9 | AL.#1100 | -do- | $(CF_3)_2CFO(CF_2)_4(CH_2)_9C-CO_2H$<br>$\quad\quad\quad\quad\quad\quad\quad\quad\quad\quad\ \ S$<br>$(CF_3)_2CFO(CF_2)_4(CH_2)_9C-CO_2H$ | as in Ex. 5 | 70° | as in Ex. 5 | Final water rinsing and heating aging step omitted |
| 10 | -do- | -do- | as in Ex. 9 | 50% (Vol) Isopropanol in Water | 60° | 0.1% | The heat aging step is performed prior immersion of the conversion coated sample in the treatment bath & the air drying of the treated sample. The water rinsing step is omitted. |
| 11 | -do- | -do- | $[(CF_3)_2CFO(CF_2)_3(CH_2)_2O]_2POOH$ | as in Ex. 5 | Rm. Temp. | as in Ex. 5 | Final water rinsing omitted |
| 12 | Copper | -do- | $(CF_3)_2CFO(CF_2)_4(CH_2)_2COOH$ | -do- | -do- | -do- | -do- |
| 13 | -do- | -do- | $(CF_3)CFO(CF_2)_6(CH_2)_2COOH$ | -do- | -do- | -do- | -do- |
| 14 | AL.#1100 | -do- | $(CF_3)_2CFO(CF_2)_9CONHCH_2CO_2H$ | -do- | -do- | -do- | -do- |
| 15 | -do- | -do- | $(CF_3)_2CFO(CF_2)_{11}CO_2H$ | -do- | -do- | -do- | -do- |
| 16 | -do- | -do- | $[(CF_3)_2CFO(CF_2)_4(CH_2)_2O]_2POOH$ | -do- | -do- | -do- | -do- |
| 17 | -do- | -do- | as in Example 16 | as in Ex. 10 | 60° | -do- | as in Example 10 |
| 18 | -do- | MBV oxide Conversion Coating Solution containing 3% sodium carbonate and 1.5% sodium chromate (see note #1) | as in Example 16 | -do- | -do- | -do- | None |
| 19 | -do- | as in Ex. 1 | $[(CF_3)_2CFO(CF_2)_4(CH_2)_2O]_2POOH$ | as in Ex. 5 | -do- | -do- | as in Ex. 9 |
| 20 | as in Ex. 1 | "Alrok" oxide Conversion Coating (see Note #2) | as in Example 16 | as in Ex. 5 | 60° | 0.1% | None |
| 21 | AL.#1100 | as in Ex. 1 | $(CF_3)_2CFO(CF_2)_4(CH_2)_2OPO(OH)_2$ | -do- | Rm. Temp. | -do- | Final Water Rinsing Omitted |
| 22 | as in Ex. 1 | MBV oxide Conversion Coating Solution containing 3% sodium carbonate and 1.5% sodium chromate (see Note #1) | as in Example 21 | as in Ex. 10 | 60° | -do- | None |
| 23 | -do- | as in Ex. 10 | as in Example 21 | as in Ex. 5 | -do- | -do- | -do- |
| 24 | Aluminum 3003 Alloy | as in Ex. 22 | as in Example 21 | -do- | -do- | -do- | -do- |
| 25 | as in Ex. 24 | -do- | $(CF_3)_2CFO(CF_2)_6CH_2CH(CH_2)_8CO_2H$<br>$(CF_3)_2CFO(CF_2)_6CH_2CH(CH_2)_8CO_2H$ | -do-<br>-do- | -do-<br>-do- | -do-<br>-do- | -do-<br>-do- |
| 26 | as in Ex. 8 | as in Ex. 1 | as in Example 25 | as in Ex. 8 | 70-75° | 0.1% | As in Example 8 |
| 27 | Copper | -do- | as in Example 21 | as in Ex. 26 | 70° | 0.1% | Treated sample is heated at 65° for 20 minutes. The heat aging step, that is heating at about 65° for 20 minutes, is performed prior to immersion of the coated conversion metal in the treatment bath & air-drying of the treated sample. |

TABLE I (cont)

| Example | Metal Substrate | Conversion Coating Applied to Metal Substrate | Treatment Agent | Treatment Agent Bath Solvent | Temp. of Bath | Conc. of Treatment Agent in Bath | Other Variations in Procedure of Example 1 |
|---|---|---|---|---|---|---|---|
| 28 | Copper | -do- | as in Example 21 | -do- | -do- | -do- | Heat aging step omitted. |
| 29 | -do- | -do- | as in Example 21 | -do- | -do- | 0.5% | Heat aging step, that is heating for 20 minutes at 65°, is performed prior to immersion of the conversion coated metal in the treatment bath & air-drying of the treated sample. |
| 30 | Copper | as in Ex. 1 (80 mins.) | as in Example 25 | -do- | -do- | 0.1% | as in Example 27 |
| 31 | -do- | -do- (30 mins.) | -do- | -do- | -do- | -do- | as in Example 28 |
| 32 | -do- | -do- (20 mins.) | -do- | -do- | -do- | -do- | As in Example 29 |
| 33 | AL.#1100 | As in Ex. 1 | As in Example 3 | as in Ex. 10 | 60° | as in Ex. 10 | As in Example 10 |
| 34 | AL.#1100 | -do- | $(CF_3)_2CFO(CF_2)_2(CH_2)_{11}OPO(OH)_2$ | -do- | -do- | 0.1% | As in Example 10 |
| 35 | -do- | -do- | a polyfluorinated alkylsulfon-amido-alkyl phosphoric ester acid as claimed in U.S.P. 3,094,547 | -do- | Rm. Temp. | -do- | Final Water Rinsing Omitted |
| 36 | Copper | -do- | a polyfluoroalkyl phosphoric ester acid as claimed in U.S.P. 3,083,224 | -do- | 60° | -do- | None |
| 37 | As in Ex. 8 | -do- | As in Example 3 | as in Ex. 8 | 70-75° | 0.1% | As in Example 8 |

NOTES

1. Disclosed by G. H. Kissin, Ed., "The Finishing of Aluminum" Reinhold Publishing Corporation 1963, p. 69, p. 72–73.
2. Disclosed by R. M. Burns and W. W. Bradley "Protective Coatings for Metals" Reinhold Publishing Corporation, 1967 p. 589, paragraph 3.

EXAMPLES 38 – 51

In several comparative experiments summarized in Table II below, the procedure of Example 1 is repeated substantially as described except that one or more of the critical elements of the invention is omitted and/or a known water-repellent agent other than those prescribed by the invention is employed as the treatment agent. In each of the summarized comparative examples, a product of little or no water-repellency is obtained.

The comparative experiments generally show that treatment agent compounds having terminal branched structures are superior to the linear structures, that longer chain treatment agents are preferred over short chain treatment agents, that the chromium conversion coating is necessary and must be satisfactory, and that fluorinated treatment agents are preferred over hydrocarbons.

TABLE II

| Example | Metal Substrate | Conversion Coating Applied to Metal Substrate | Treatment Agent | Treatment Agent Bath Solvent | Temp. of Bath | Conc. of Treatment Agent in Bath | Other Variations in Procedure of Example 1 |
|---|---|---|---|---|---|---|---|
| 38 | AL. No. 1100 | as in Ex. 1 | $(CF_3)_2CFO(CF_2)_2(CH_2)_2CO_2H$ | as in Ex. 5 | Rm. Temp. | 0.1% | Final Water Rinsing Omitted |
| 39 | " | " | $(CF_3)_2CFO(CF_2)_2(CH_2)_2N(C_2H_5)_2$ | " | " | " | " |
| 40 | AL No. 3003 | " | $CH_3(CH_2)_{14}CH_2NH_2$ | " | 60-65° | " | None |
| 41 | Copper | " | as in Example 38 | " | " | " | " |
| 42 | as in Ex. 24 | " | $CH_3(CH_2)_{16}CO_2H$ | " | " | " | " |
| 43 | as in Ex. 24 | " | Equimolar mixture of $[CH_3CH(C_2H_5)(CH_2)_4O]PO(OH)_2$ and $[CH_3CH(C_2H_5)(CH_2)_4O]_2PO(OH)$ | " | " | " | " |
| 44 | as in Ex. 36 | " | as in Example 41 | " | " | " | " |
| 45 | as in Ex. 24 | as in Ex. 1 | None | None | — | 0 | as in Example 26 immersion in treatment bath omitted |
| 46 | " | " | as in Example 42 | as in Ex. 26 | 70-75° | as in Ex. 1 | " |

TABLE II -Continued

| Example | Metal Substrate | Conversion Coating Applied to Metal Substrate | Treatment Agent | Treatment Agent Bath Solvent | Temp. of Bath | Conc. of Treatment Agent in Bath | Other Variations in Procedure of Example 1 |
|---|---|---|---|---|---|---|---|
| 47 | as in Ex. 36 | " | D.C. 1107, a thermally polymerizable methyl hydrogen polysiloxane manufactured by Dow Corning Chemical Company | isopropanol | 60° | " | The treated sample is heated for 30 minutes at 100° to ensure polymerization of the siloxane. |
| 48 | AL. No. 3003 | " | as in Example 45 | " | " | " | None |
| 49 | Copper | " | None | None | — | 0.0 | The immersion of the conversion coated sample in the treatment agent bath is omitted. The sample is heated at 65° for 20 minutes. |
| 50 | " | None | as in Example 21 | as in Ex. 26 | 70° | as in Ex. 1 | Heating of treated sample is omitted. |
| 51 | " | " | as in Example 25 | " | " | " | |

The following Example 52 illustrates the drop-wise, condensation promoting effect of the novel metal products of the invention

EXAMPLE 52

Each of the conversion coated metal products of Examples 1–37 and of comparative examples 38–51 is inserted at room temperature at an angle of 45 degrees in a vertical jet of steam and maintained therein for 30 seconds, the nature of the water condensate which forms on inclined surface of the metal being noted. On the conversion coated metal products of Examples 1–37 which are treated in accordance with the invention, the steam condenses as small water droplets. On the conversion coated metal products of comparative Examples 38–51 which are not treated in accordance with the invention, the steam condenses as a continuous water film on the product surface.

Substantially similar results are achieved according to this experiment when the jet of steam is replaced by a jet at 78° of the vaporized binary azeotrope of ethyl alcohol and water which contains 95.5% ethyl alcohol and 4.5% water and which boils at 78.1°.

The foregoing experiment illustrates that novel metal products of the invention promote drop-wise condensation of aqueous vapors impinging on the product surface whereas comparble conversion coated metal products, which are not treated in accordance with the invention and which include conversion coated metals treated with water-repellents other than those contemplated by the invention, promote undesirable film-wise condensation of such vapors.

The following example 53 illustrates the criticality of applying the treatment agent to the metal substrate subsequent to application of the conversion coating.

EXAMPLE 53

The procedure of Example 26 is repeated substantially as described except that the polyfluorinated dicarboxylic acid treatment agent is charged as a 1 percent solution of isopropyl alcohol to a chromating bath as previously described to provide a conversion coating solution containing 0.1 percent of the treatment agent. The resultant conversion-coated aluminum alloy sample is removed from the chromating bath, rinsed with water at room temperature and allowed to dry and age by standing at room temperature for three days. The resultant treated sample has advancing and receding contact angles with water of 0 degree indicating that the sample is not water-repellent. Contact with steam according to the procedure of Example 52 results in undesirable filmwise condensation of water on the treated sample.

The following examples 54 through 61 in Table III indicate how the invention may be applied to promote dropwise condensation on metallic substrates for extended periods:

TABLE III

TREATMENTS APPLIED TO CU TUBES FOR STEAM CHAMBER LIFE TESTS

| Example | Substrate Pre-Treatment | Cromating Conditions | Fluorotreating Agents & Conditions | Remarks |
|---|---|---|---|---|
| 54 | Alkaline Clean & Deoxidize Cu Tube | 4. Gm./L $CrO_3$ 2.8Gm./L NaF + $HNO_3$ to pH – 1.8 | 0.1% Mixed $(R_fR'-O)_xPO(OH)_{3-x}$ in $IPA/H_2O$ – 2 min. at 60°C. where $R_f$ is $(CF_3)_2CFO(CF_2)_{4-}$, R' is $-(CH_2)_{2-}$ and x is 1 and 2 | Drop-wise condensation results when used as a condenser for steam for a period in excess of one year before voluntary shutdown. |
| 55 | -do- | -do- | 0.1% $[C_3F_7O(CF_2)_6CH_2CH(CH_2)_8COOH]_2$ 2 min. at 60°C. | Drop-wise condensation results when used as a condenser for steam for a period in excess of 1-1/2 years before voluntary shutdown. |
| 56 | -do- | -do- | 0.1% $C_3F_7O(CF_2)_4(CH_2)_9CHCOOH$ <br> $\quad\quad\quad\quad\quad\quad\quad$ S <br> $C_3F_7O(CF_2)_4(CH_2)_9CHCOOH$ <br> 2 min. at 60° C. | Drop-wise condensation results when used as a condenser for steam for a period of 3 months before voluntary shutdown. |

TABLE III—Continued

TREATMENTS APPLIED TO CU TUBES FOR STEAM CHAMBER LIFE TESTS

| Example | Substrate Pre-Treatment | Cromating Conditions | Fluorotreating Agents & Conditions | Remarks |
|---------|------------------------|----------------------|-----------------------------------|---------|
| 57 | No Deoxidizer | -do- | 0.1% S-bridged Dimer as in 56 above | -do- |
| 58 | -do- | -do- | 0.4% Dimer as in 56 above | -do- |
| 59 | As in Ex. 54 exc. AL Tube Substrate | As in Ex. 54 | As in Ex. 54 | As in Ex. 54 |
| 60 | As in Ex. 57 exc. AL Tube Substrate | As in Ex. 55 | As in Ex. 55 | As in Ex. 55 |
| 61 | As in Ex. 58 exc. AL Tube Substrate | As in Ex. 56 | As in Ex. 56 | As in Ex. 56 |

The following Example 62 illustrates the synergistic improvement in resistance to attack by 0.1 percent by weight aqueous potassium sulfide imparted to metals when treated in accordance with the improved process of the invention. The results are reported in Table IV below:

experimentally determined tarnish times in A is unexpectedly at least about 200 percent greater than the sum of the tarnish time of B and G; the experimentally determined tarnish time in C is unexpectedly at least 270 percent greater than the sum of the tarnish times of D and E and the experimentally determined tarnish

TABLE IV

| PRODUCT CHARGED | TIME REQUIRED TO DEVELOP A BLACK COPPER SULFIDE TARNISH ON METAL SAMPLE WHEN CONTACTED WITH ABOUT 0.1% AQUEOUS POTASSIUM SULFIDE |
|---|---|
| A. CHROMATE CONVERSION COATED COPPER TREATED WITH FLUORINATED PHOSPHORIC ESTER ACID IN ACCORDANCE WITH: | |
| EXAMPLE 27 | about 40 minutes |
| EXAMPLE 28 | about 20 minutes |
| EXAMPLE 29 | about 40 minutes |
| B. COPPER DEVOID OF CONVERSION COATING TREATED WITH FLUORINATED PHOSPHORIC ESTER ACID IN ACCORDANCE WITH | |
| EXAMPLE 50 | about 5 seconds |
| C. CHROMATE CONVERSION COATED COPPER TREATED WITH FLUORINATED DICARBOXYLIC ACID IN ACCORDANCE WITH | |
| EXAMPLE 30 | about 80 minutes |
| EXAMPLE 31 | about 30 minutes |
| EXAMPLE 32 | about 80 minutes |
| D. COPPER DEVOID OF CONVERSION COATING TREATED WITH FLUORINATED DICARBOXYLIC ACID IN ACCORDANCE WITH | |
| EXAMPLE 51 | about 1 minute |
| E. CHROMATE CONVERSION COATED COPPER TREATED WITH SULFUR CROSS LINKED DIMER ACID IN ACCORDANCE WITH | |
| EXAMPLE 56 | about 20 minutes |
| F. COPPER DEVOID OF CONVERSION COATING TREATED ONLY WITH 0.1% SULFUR DIMER ACID $[(CF_3)_2CFO(CF_2)_4-CH-COOH\ |\ S\ 1/2]_2$ FOR TWO MINUTES AT ROOM TEMPERATURE | about 1 minute |
| G. CHROMATE CONVERSION COATED COPPER DEVOID OF THE TREATMENT AGENT OF A, B, C, D, E AND F ABOVE PREPARED IN ACCORDANCE WITH EXAMPLE 49. | about 10 minutes |

From the results of Table IV it is apparent that were the corrosion protection afforded by the chromate conversion coating and the treatment agents merely additive, the time required to develop black copper sulfide tarnish in A, C and E would be only about 10 minutes, 5 seconds; 11 minutes; and 11 minutes respectively, since the sum of the tarnish times in B and G is only 10 minutes, 5 seconds and the sum of the tarnish times in D and G; and E and G is only 11 minutes. However, the time in E is unexpectedly about 182 percent greater than the sum of F and G. Accordingly, the results of this example clearly demonstrate a synergistic improvement in resistance to aqueous corrosion agents achieved by the novel improvement of the invention.

The following Example 63 Table V shows the increased corrosion resistance of aluminum surfaces prepared in accordance with the invention when exposed to aqueous salt spray.

TABLE V

EXAMPLE 63

| SAMPLE TESTED | AVERAGE CORROSION PITS PER SQUARE INCH OF SAMPLE AFTER CONTINUOUS EXPOSURE TO AQUEOUS SALT SPRAY FOR 1500 HOURS ACCORDING TO ASTM-B-17 |
|---|---|
| A. CHROMATE CONVERSION COATED 3003 ALUMINUM ALLOY TREATED WITH FLUORINATED DICARBOXYLIC ACID ACCORDING TO EXAMPLE 26 | 0.2 |
| B. CHROMATE CONVERSION COATED 3003 ALUMINUM ALLOY TREATED WITH FLUORINATED ISOALKOXYALKYL PHOSPHORIC ESTER ACID ACCORDING TO EXAMPLE 37 | 0.9 |
| C. CHROMATE CONVERSION COATED 3003 ALUMINUM ALLOY TREATED WITH FLUORINATED ISOALKOXYALKYL PHOSPHORIC ESTER ACID ACCORDING TO EXAMPLE 8 | 1.5 |
| D. CHROMATE CONVERSION COATED 3003 ALUMINUM ALLOY TREATED WITH NON-FLUORINATED MIXTURE OF MONO AND DI 2-ETHYLHEXYL ESTERS PHOSPHORIC ACID ACCORDING TO EXAMPLE 43 | 4.0 |
| E. CHROMATE CONVERSION COATED 3003 ALUMINUM ALLOY UNTREATED WITH WATER-REPELLENT AGENT ACCORDING TO EXAMPLE 45 | 4.2 |

I claim:

1. A process for treating a metallic substrate formed of a material selected from the group consisting of copper, aluminum, copper alloys and aluminum alloys to obtain a dropwise condensation promoting surface which process comprises:
   a. cleaning the surface of the substrate;
   b. applying a first solution comprising chromate ions to the substrate to form a chromate ion treated surface; and
   c. applying, to the chromate ion treated surface, a fluorinated compound having a perfluorinated alkyl or alkoxy chain containing at least 6 carbon atoms and having at least one reactive group which is a carboxylic acid or a phosphate.

2. The process of claim 1 wherein the solution is essentially free from phosphate ions.

3. The process of claim 2 wherein the solution contains fluoride ions.

4. The process of claim 1 wherein the fluorinated compound is applied in a second solution and the perfluorinated chain contains 6 to 48 carbon atoms.

5. The process of claim 4 wherein the fluorinated compound has at least one reactive carboxylic acid group.

6. The process of claim 5 wherein the fluorinated compound has two reactive carboxylic acid groups.

7. The process of claim 4 wherein the fluorinated compound has at least one reactive phosphate group.

8. The process of claim 4 wherein the first solution comprises chromic acid.

9. The process of claim 5 wherein the fluorinated compound is $$R_fO(CF_2)_m(CH_2)_nCH_2COOH$$

wherein $R_f$ is a perfluoroalkyl radical containing from 3 to 12 carbon atoms, $m$ is an integer of 2 to 10 and $n$ is an integer of 0 to 10 said fluorinated compound containing at least six carbon atoms.

10. The process of claim 6 wherein the fluorinated compound is:

$$R_fO(CF_2)_m(CX_2)_pCH_2\underset{|}{CH}(CX_2)_nCOOH$$

$$R_fO(CF_2)_m(CX_2)_pCH_2-CH(CX_2)_nCOOH$$

where $R_f$ is a perfluoroalkyl radical containing 3 to 12 carbon atoms, $m$ independently at each occurrence is an integer of 2 to 10, $n$ independently at each occurrence is an integer of 0 to 10, $p$ independently at each occurrence is an integer of 0 to 10 and X is H or F and may be the same or different at each occurrence said fluorinated compound containing at least six carbon atoms.

11. The process of claim 6 wherein the fluorinated compound is:

$$R_fO(CF_2)_m(CX_2)_pCH_2\underset{|}{CH}(CX_2)_nCOOH$$
$$\underset{|}{Q}$$
$$R_fO(CF_2)_m(CX_2)_pCH_2CH(CX_2)_nCOOH$$

wherein $R_f$ is a perfluoroalkyl radical containing 3 to 12 carbon atoms, $m$ is independently at each occurrence an integer of 2 to 10, $n$ independently at each occurrence is an integer of 0 to 10, $p$ is independently at each occurrence an integer of 0 to 10, X is H or F and may be the same or different at each occurrence and Q is $—S(C_zH_{2z}S)t—$ where $z$ is 2 to 6 and $t$ is 0 to 1 said fluorinated compound containing at least six carbon atoms.

12. The process of claim 7 wherein the fluorinated compound is:

$$[R_fSO_2N(R)(R')O]_yPO(OH)_{3-y}$$

wherein R is hydrogen or an alkyl group having 1 to 12 carbon atoms, R' is an alkylene linking group containing 2 to 12 carbon atoms, $R_f$ is a perfluoroalkyl group containing 6 to 12 carbon atoms and $y$ is 1 to 2.

13. The process of claim 7 wherein the fluorinated compound is:

$$[R_fO(CF_2)_m(CX_2)_nCH_2CH_2O]_yPO(OH)_{3-y}$$

wherein $R_f$ is a perfluoroalkyl radical containing 3 to 12 carbon atoms, $m$ is an integer of 2 to 10, $n$ is an integer of 0 to 10, X is independently at each occurrence H or F and $y$ is 1 to 2.

14. The process of claim 4 wherein the metal substrate is aluminum.

15. The process of claim 4 wherein the metal substrate is aluminum alloy.

16. The process of claim 4 wherein the metal substrate is copper.

17. The process of claim 6 wherein the fluorochemical is

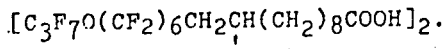

18. The process of claim 6 wherein the fluorochemical is

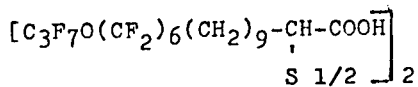

19. The process of claim 7 wherein the fluorinated compound comprises $[C_3F_7O(CF_2)_6C_2H_4O]_2 PO(OH)$.

20. The process of claim 7 wherein the fluorochemical is a mixture comprising between about 80 and about 90 mole percent $[C_3F_7O(CF_2)_6C_2H_4O]_2PO(OH)$ and between about 10 and about 20 mole percent $C_3F_7O(CF_2)_6C_2H_4O—PO(OH)_2$.

21. A substrate treated in accordance with the process of claim 1.

22. A substrate treated in accordance with the process of claim 2.

23. A substrate treated in accordance with the process of claim 3.

24. A substrate treated in accordance with the process of claim 4.

25. A substrate treated in accordance with the process of claim 5.

26. A substrate treated in accordance with the process of claim 6.

27. A substrate treated in accordance with the process of claim 7.

28. A substrate treated in accordance with the process of claim 8.

29. A substrate treated in accordance with the process of claim 9.

30. A substrate treated in accordance with the process of claim 10.

31. A substrate treated in accordance with the process of claim 11.

32. A substrate treated in accordance with the process of claim 12.

33. A substrate treated in accordance with the process of claim 13.

34. A substrate treated in accordance with the process of claim 17.

35. A substrate treated in accordance with the process of claim 18.

36. A substrate treated in accordance with the process of claim 19.

37. A substrate treated in accordance with the process of claim 20.

38. A process for treating a metallic substrate formed of a material selected from the group consisting of copper, aluminum, copper alloys and aluminum alloys to obtain a dropwise condensation promoting surface which process comprises:
   a. applying a first solution comprising chromate ions to a clean substrate to form a chromate ion treated surface; and
   b. applying, to the chromate ion treated surface a fluorinated compound having a perfluorinated alkyl or alkoxy chain containing at least 6 carbon atoms and having at least one reactive group which is a carboxylic acid or a phosphate.

39. A process for treating a chromate ion treated metallic substrate said substrate being formed of a material selected from the group consisting of copper, aluminum, copper alloys and aluminum alloys to obtain a drop-wise condensation promoting surface which process comprises: alkoxy applying, to said substrate, a fluorinated compound have a perfluorinated alkyl or alkoxy chain containing at least 6 carbon atoms and having at least one reactive group which is a carboxylic acid or a phosphate.

40. A substrate treated in accordance with the process of claim 38.

41. A substrate treated in accordance with the process of claim 39.

* * * * *